W. L. WALLICK.
BRIDLE.
APPLICATION FILED AUG. 8, 1913.
1,097,490.
Patented May 19, 1914.
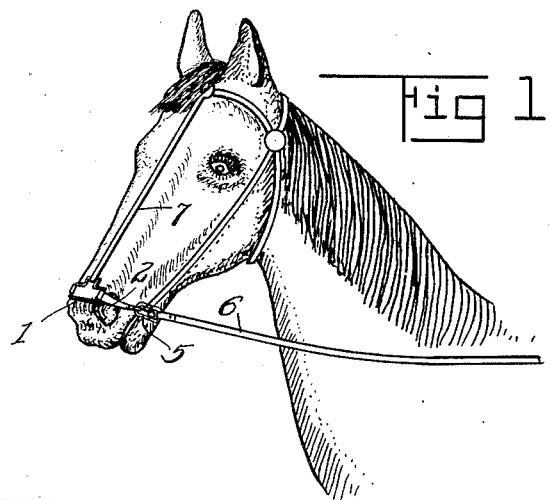
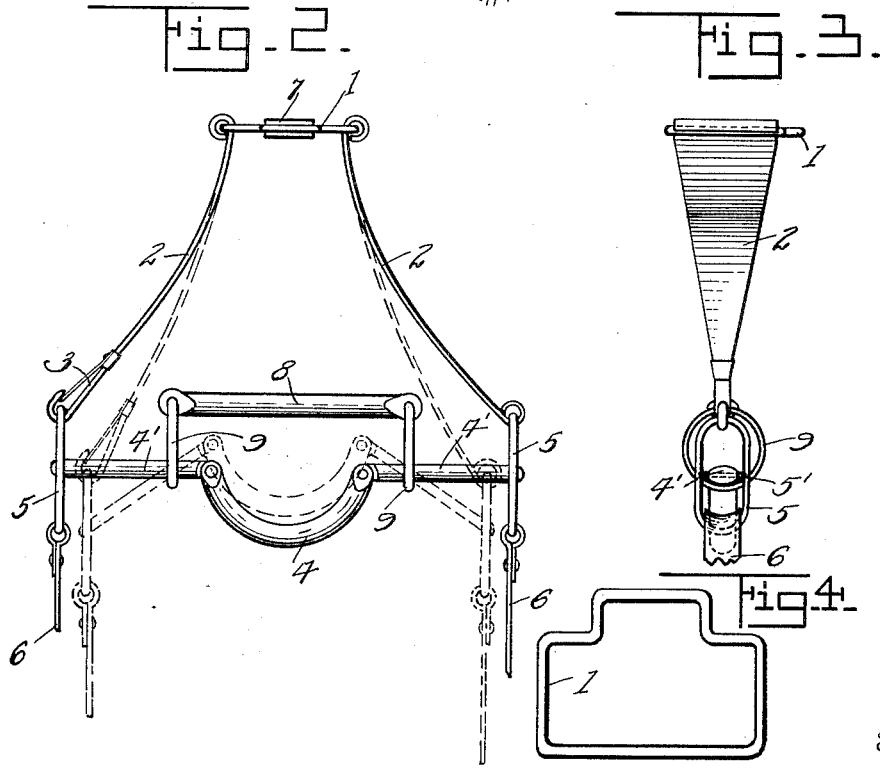
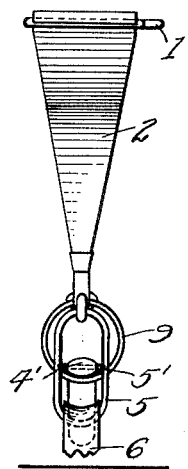
Witnesses
L. Cloud Newman.
G. W. Kirkley
Inventor
W. L. Wallick
By Robt H Pitt
Attorneys

UNITED STATES PATENT OFFICE.

WILLIS L. WALLICK, OF ALEXANDRIA, INDIANA.

BRIDLE.

1,097,490.  Specification of Letters Patent.  Patented May 19, 1914.

Application filed August 8, 1913. Serial No. 783,758.

*To all whom it may concern:*

Be it known that I, WILLIS L. WALLICK, a citizen of the United States, residing at Alexandria, in the county of Madison and State of Indiana, have invented certain new and useful Improvements in Bridles, of which the following is a specification.

The object of this invention has been to devise a simple form of bridle for horses designed especially with a view of more effective control of the animal when being driven. In carrying out the invention the bridle is provided with members extending over the nose of the animal in such a way that by abnormal pull or tension on the driving lines said members may be caused to impinge and partly close the horse's nostrils, so as to cause a choking action which effectively accomplishes the desired result.

By the use of the invention liability of fractious horses running away is eliminated, the invention being advantageous, however for properly maintaining horses or like animals under restraint especially when they have become frightened unduly.

With the foregoing and other objects in view, a full understanding of the invention will be had upon reference to the accompanying detail description and drawings appended hereto, in which—

Figure 1 is a perspective view showing a bridle embodying the invention applied to the head of a horse. Fig. 2 is a front view of the restraining means, dotted lines illustrating the extent of movement of the presser plates, levers and chin piece. Fig. 3 is a side view of the same; and Fig. 4 is a detail view of the link that connects the presser plates together.

The bridle illustrated as having the invention applied thereto is the conventional form and therefore not particularly described. The restraining means forming the essential feature of the invention includes primarily a link 1 arranged above the nose of the animal and connected with the supporting strap 7 which leads to the brow band of the bridle. The link 1 has its opposite ends pivotally connected with the spaced presser plates 2, one of said plates being provided with a snap hook 3 detachably connecting the same with a pivot member 5, while the other presser plate is permanently connected with its corresponding member 5. There are two of the pivot members 5, the same being pivotally mounted intermediate their ends by cross bars 5' upon the outer extremities of levers 4' which are pivotally connected at their inner ends with a chin piece 4 designed to engage with the head of the horse approximately beneath the animal's chin. The upper ends of the pivot members 5 are connected with the presser plates 2 while the other or lower ends of said members have the reins 6 attached thereto in any suitable manner. Associated with the chin piece 4 which is curved to conform with the portion of the animal's head against which it fits, is a bit, said bit being provided with the rings 9 at its opposite ends and said rings having the levers 4' passing therethrough as shown most clearly in Fig. 2 of the drawings. Under normal conditions, therefore, the lower jaw of the animal is received between the bit 8 and the chin piece 4 and under ordinary driving conditions the levers 4' are practically in alinement, extending in opposite directions from the chin piece 4. With the parts thus arranged the presser plates 2 rest comparatively lightly on the nose of the animal just above the nostrils.

The operation of the bridle will be apparent on reference to the illustration in Fig. 2 from which it will be understood that when the animal becomes unmanageable by ordinary tension on the driving lines 6, an abnormal pull on said lines by the driver will cause a pivotal movement of the levers 4' toward the neck of the animal, such movement forcing the presser plates 2 hard against the nose of the horse in such a way as to have a tendency to choke him effectively and therefore facilitate the desired control on the part of the driver. The relative movement of the parts 2 and 4' is such that the chin piece 4 is likewise forced upwardly against the lower jaw of the horse, when the unusual tension is placed on the lines 6 so that the restraining means not only operates against the nose portion of the animal but also on his lower jaw in such a way as to eliminate possibility of the horse becoming unmanageable.

Having thus described the invention, what is claimed as new is:—

1. A bridle for horses and similar animals comprising spaced presser plates, a link having its ends pivotally connected with corresponding ends of said presser plates, a chin piece, levers pivoted to the chin piece and connecting the same with the other corresponding ends of the presser plates whereby to cause relative movement of the presser plates toward and from each other and a relative movement of the chin piece in respect to said plates, a bit spaced from the chin piece, and connections between the bit and said levers.

2. A bridle comprising spaced presser plates, a chin piece, normally alined levers connected with and extending in opposite directions from the chin piece and with the lower ends of said presser plates, a member pivotally connected with the other ends of the presser plates, a bit spaced from the chin piece and parallel with said levers, connections between opposite ends of the bit and said levers, and means for causing relative movement of the presser plates toward each other and relative movement of the chin piece and bit toward each other.

3. A bridle comprising spaced presser plates, a chin piece, levers connected with the chin piece and with the lower ends of said presser plates, a member connecting the other ends of the presser plates, a bit spaced from the chin piece, connections between opposite ends of the bit and said levers, means for causing relative movement of the presser plates toward each other and relative movement of the chin piece and bit toward each other and consisting of pivoted members, one permanently connecting one of the presser plates with its adjacent lever and the other detachably connecting its adjacent presser plate with the associated lever, and driving lines connected with said pivot members.

4. A bridle for horses and the like comprising restraining means adapted to fit the nose portion of the animal and including spaced presser plates, a link connecting corresponding ends of said plates, a chin piece, levers extending in opposite directions from the chin piece, pivoted members pivotally connecting the other corresponding ends of the presser plates with said levers, lines connected with the pivot members, a bit, and rings connecting opposite ends of the bit with the levers.

In testimony whereof I affix my signature in presence of two witnesses.

WILLIS L. WALLICK.

Witnesses:
JAMES A. MAY,
WILLIAM E. HERRON.

---

Copies of this patent may be obtained for five cents each, by addressing the "Commissioner of Patents, Washington, D. C."